| United States Patent [19] | [11] Patent Number: 4,985,149 |
| Ohshima et al. | [45] Date of Patent: Jan. 15, 1991 |

[54] ANAEROBIC DIGESTION METHOD

[75] Inventors: Yoshio Ohshima, Tsukuba; Tsunekazu Watanabe, Tokyo; Keizaburo Watanabe, Tokyo; Noboru Nonoyama, Tokyo; Masayoshi Kitazume, Tokyo; Yukihiro Tomita, Toride, all of Japan

[73] Assignees: Public Works Research Institute, Ministry of Construction, Tsukuba; Kabushiki Kaisha Yakult Honsha; Fujita Corporation, both of Tokyo, all of Japan

[21] Appl. No.: 325,925

[22] Filed: Mar. 20, 1989

[51] Int. Cl.$^5$ .............................................. C02F 3/28
[52] U.S. Cl. .................................... 210/603; 210/613; 210/769; 241/21; 241/DIG. 38
[58] Field of Search ............... 210/603, 613, 631, 769, 210/601; 241/2, 21, DIG. 38, 189

[56] References Cited

U.S. PATENT DOCUMENTS

| 3,847,803 | 11/1974 | Fisk | 210/631 |
| 4,040,953 | 8/1977 | Ort | 210/603 |
| 4,289,625 | 9/1981 | Tarman et al. | 210/603 |
| 4,342,650 | 8/1982 | Erickson et al. | 210/613 |
| 4,386,159 | 5/1983 | Kanai | 210/603 |
| 4,511,370 | 4/1985 | Hunziker et al. | 210/603 |

Primary Examiner—Stanley Silverman
Assistant Examiner—Christopher Upton
Attorney, Agent, or Firm—Oblon, Spivak, McClelland, Maier & Neustadt

[57] ABSTRACT

Sewage sludge or an agricultural or fish waste material is subjected to pretreatment in the form of wet mill treatment and then is subjected to anaerobic digestion.

1 Claim, No Drawings

ANAEROBIC DIGESTION METHOD

BACKGROUND OF THE INVENTION

This invention relates to a method for anaerobic digestion of organic sludge such as sewage sludge and sludge from agricultural and fish waste products Conventionally, raw sludge, excess sludge and the like which are formed in sewage treatment plants have been treated by dehydration followed by incineration after which they have been discarded. However, in recent years, it is becoming more common to treat sewage by the anaerobic digestion method. The anaerobic digestion method is one in which so-called methanogens are propagated in an anaerobic state, whereby the organic substances in the sewage are broken down primarily into methane gas. As a result, the amount of solids in the sludge is decreased. At the same time, methane gas, which can be utilized as a fuel, is obtained. The anaerobic digestion method has many other advantages such as that it consumes little energy, the mortality of pathogenic bacteria is high, and the digested sludge can be easily disposed of. However, the rate of propagation of methanogens is extremely low, so this method has the drawback that treatment of sludge requires much time.

There have been many different proposals for increasing the speed of anaerobic digestion. For example, an article in Kankyo Gijutsu (Environmental Technology) Magazine (Vol. 13, No. 11, pp. 772-780 (1984)) discloses a method in which excess sludge which is formed in an activated sludge tank is first treated by acid treatment, alkali treatment, or heat treatment, after which it undergoes anaerobic digestion. Japanese Patent Application Laid Open No. 58-72600 discloses a method in which sludge is first solubilized by ultrasonic treatment, after which anaerobic digestion is carried out.

However, even when excess is subjected to such pretreatments, it takes a long retention period of 15-20 days to achieve a digestion rate of around 50%. Furthermore, even if the retention period is further increased, the upper limit on the digestion rate is only about 55%.

The same problems are encountered when it is attempted to perform anaerobic digestion of waste products from factories for processing agricultural and fish products such as starch factories and food product factories, livestock feces and urine, livestock carcasses, fish entrails and bones, and the like. For this reason, there is still very little use of anaerobic digestion in these fields.

Thus, as described above, conventional anaerobic digestion methods suffer from the problems of being inefficient, of therefore requiring a large digestion tank, and of being unable to produce an sufficient decrease in the amount of solids.

SUMMARY OF THE INVENTION

Accordingly, it is the object of the present invention to provide an anaerobic digestion method which overcomes the above-described problems of conventional methods and which can achieve a high rate of digestion in a short length of time.

In the present invention, this object is achieved by performing pretreatment in the form of wet mill treatment of a waste product and then subjecting the pretreated waste product to anaerobic digestion.

DETAILED DESCRIPTION OF THE INVENTION

Next, the anaerobic digestion method of the present invention will be described in greater detail.

The wet mill treatment which is performed in the present method as pretreatment is for the purpose of applying primarily a shear force on solids which are suspended in water so as to refine the solids. In the present invention, wet mill treatment refers to treatment which produces extensive grinding and includes treatment using a rotating cylinder mill, a vibrating ball mill, a centrifugal ball mill, a medium stirring mill, a colloid mill, and the like. The mill which is used for the wet mill treatment can be selected from any of the above mills in accordance with the properties of the material being treated, but a medium stirring mill is preferred because it provides superior effects.

A medium stirring mill is one in which a stirring disk which is inserted into a cylindrical vessel is rotated at a high speed, and small balls or beads which are housed inside the vessel are violently stirred. The beads exert a shearing force on the material being treated and crush the material The size of the beads varies in accordance with the use, but in the present invention, beads having a diameter of 0.05-1 mm are preferred. When using beads of this size, a suitable rotational speed for the stirring disk is 1000-3000 rpm (a circumferential speed of 10-30 m/sec), and when treating normal sludge, a treatment time of 5-60 minutes is appropriate.

If necessary, the wet mill treatment can be performed together with another type of pretreatment, such as ultrasonic treatment. When the material being treated is raw sludge, an agricultural waste material, or the like which contains coarse substances, it is desirable to adequately crush the material using a mixer or the like prior to wet mill treatment.

After the wet mill treatment, anaerobic digestion can be performed by any desired method, and there are no restrictions on the type of anaerobic bacteria which are employed, the temperature during digestion, the number of days for which digestion is performed, the type of digestion tank, and the like.

The anaerobic digestion method in accordance with the present invention is suitable for treatment of all types of sewage sludge and agricultural waste materials as well as for treatment of mixtures thereof.

The wet mill treatment of the method of the present invention produces extensive crushing, breaking down even the cell walls of microbes which are present in the sludge or other material being treated, and causing fibrillation of cellulose fibers. As a result, the great majority of the organic substances in the material being treated are broken down into a form in which they can be easily utilized as a substrate by anaerobic bacteria. Therefore, even when treating excess sludge or digested sludge which has a high content of microbes which are difficult to digest, it is possible to digest the sludge in a short length of time.

Next, the present invention will be described in further detail by way of the following working examples.

EXAMPLE 1

Raw sludge, excess sludge, and digested sludge (digested by anaerobic digestion) which were formed in a standard municipal sewage treatment facility were treated respectively using a medium stirring mill (a Dynomill manufactured by Bachofen Co. of Switzerland). The bead diameter was 0.1 mm, the rotational speed of the disk was 3000 rpm (circumferential speed = 15m/sec), and the treatment time was 20 minutes. The treated sludge was placed together with digestion sludge into a 10-liter digestion tank. Anaerobic digestion was performed while the sludge tank temperature was maintained at 37° C. + 3° C. and the mixture was stirred at 200 rpm with a rotating stirrer. For comparison, the same sludge was subjected to anaerobic digestion without first undergoing wet mill treatment.

The results are shown in Table 1. Compared with when wet mill treatment was not performed, the effectiveness of digestion in accordance with the present invention was approximately 1.2 times as high for raw sludge, approximately 1.5 times as high for excess sludge, and approximately 3 times as high for digested sludge.

COMPARATIVE EXAMPLE

The procedure of Example 1 was repeated with the exception that treatment with a mixer and ultrasonic treatment were performed as pretreatment in place of the wet mill treatment of the present invention. The results are shown in Table 2. The pretreatment conditions were as follows.

Mixer treatment—Treatment was performed for 1 hour at 15,000 rpm using a mixer equipped with rotating inner and outer blades.

Ultrasonic treatment—1 liter of sludge was subjected to ultrasonic waves (20 KHz, 150W) for 1 hour.

TABLE 1

| sludge | cumulative amount of gas generated during days shown below (l) | | | | | | | decomposition rate after 10 days | |
|---|---|---|---|---|---|---|---|---|---|
| | 1 day | 2 | 3 | 4 | 5 | 8 | 10 | A* | B* |
| digestion sludge only | 1.2 | 1.2 | 1.2 | 1.2 | 1.2 | 1.2 | 1.2 | 19.9 | — |
| raw sludge | | | | | | | | | |
| no pretreatment | 2.5 | 3.7 | 7.4 | 10.1 | 11.8 | 13.6 | 15.2 | 49.1 | 71.1 |
| wet-mill treatment | 2.7 | 4.1 | 6.8 | 10.4 | 14.1 | 16.3 | 17.6 | 55.6 | 82.5 |
| excess sludge | | | | | | | | | |
| no pretreatment | 2.0 | 3.7 | 5.0 | 6.0 | 6.4 | 7.5 | 8.5 | 33.5 | 44.8 |
| wet-mill treatment | 2.3 | 4.0 | 5.7 | 7.2 | 8.3 | 10.5 | 12.0 | 44.1 | 64.3 |
| digested sludge | | | | | | | | | |
| no pretreatment | 1.5 | 1.6 | 1.8 | 2.0 | 2.3 | 2.8 | 3.2 | 14.8 | 10.2 |
| wet-mill treatment | 1.5 | 2.0 | 2.5 | 3.2 | 4.0 | 5.2 | 6.0 | 25.1 | 30.0 |

*A: decompositon rate of mixed sludge containing digestion sludge
*B: decomposition rate of charged sludge

TABLE 2

| pretreatment | amount of gas generated per charged organics (l/g) type of sludge | | | decomposition rate of organics (%) type of sludge | | |
|---|---|---|---|---|---|---|
| | raw | excess | digested | raw | excess | digested |
| no pretreatment | 0.62 | 0.32 | 0.08 | 71.1 | 44.8 | 10.2 |
| mixer treatment | 0.62 | 0.34 | 0.08 | 71.0 | 48.4 | 10.8 |
| ultra sonic treatment | 0.68 | 0.40 | 0.19 | 78.0 | 56.9 | 24.7 |
| wet-mill treatment | 0.71 | 0.45 | 0.23 | 82.5 | 64.3 | 30.0 |

EXAMPLE 2

Raw sludge, excess sludge, and digested sludge which were taken from a municipal sewage treatment plant were subjected to pretreatment under the conditions listed below, after which digestion sludge was added thereto and a batch digestion test was performed at 37° C. ± 2° C. For comparison, a digestion test was also performed without pretreatment.

| Abbreviation | Type of Pretreatment |
|---|---|
| M | Wet mill treatment |
| A-M | Wet mill treatment after addition of 0.05 N caustic soda |
| H-M | Wet mill treatment performed with heating by passing hot water at 80° C. through jacket of wet mill. |
| A-H-M | After addition of 0.05 N caustic soda, wet mill treatment performed with heating by passing hot water at 80° C. through jacket of wet mill. |

(With the exception of the temperatures in H-M and A-H-M, the conditions for wet mill treatment were the same as for Example 1).

After performing anaerobic digestion for 10 days, the amount of gas which was generated and the breakdown rate of volatile solids, i.e., of organic materials were as shown in Table 3.

Table 3

| Sample and Pretreatment | Gas Generation (l/VS · kg) | VS Decomposition Rate (%) |
|---|---|---|
| raw sludge | | |
| no pretreatment | 510 | 70 |
| M | 550 | 81 |
| A-M | 560 | 82 |
| H-M | 560 | 83 |
| A-H-M | 570 | 83 |
| excess sludge | | |
| no pretreatment | 310 | 43 |
| M | 450 | 61 |
| A-M | 530 | 70 |
| H-M | 530 | 69 |
| A-H-M | 550 | 72 |
| digested sludge | | |
| no pretreatment | 50 | 9 |
| M | 210 | 31 |
| A-M | 230 | 35 |
| H-M | 230 | 33 |
| A-H-M | 270 | 38 |

As described above, in the anaerobic digestion method of the present invention, a material being treated is subjected to a high degree of crushing by wet mill treatment, so even the cell walls of microbes are broken down. Compared to pretreatment by pulverization such as that performed by a mixer in which merely floc and the like are broken down, the speed of digestion is remarkably increased and the digestion rate is also improved. Although ultrasonic treatment can also break down the cell walls of microbes, ultrasonic treatment is unsuitable as a pretreatment method for sewage on a large scale because (1) it is difficult and expensive to manufacture a generator of ultrasonic waves having a large output, and (2) it takes a long time to achieve an adequate effect using ultrasonic wave. Thus, ultrasonic treatment is disadvantageous with respect to both cost and efficiency and is unsuitable for large-scale treatment of sludge. In contrast, a large apparatus for wet mill treatment can be easily and inexpensively manufactured, wet mill treatment can be performed with high efficiency, and is consumes little energy, so it can be easily carried out on either a small or large scale.

What is claimed is:

1. An anaerobic digestion method for excess sludge from a sewage treatment process, comprising:

subjecting the excess sludge to be digested to a medium stirring mill treatment with a medium stirring mill equipped with glass beads having a diameter of 0.05 to 1 mm and said mill treatment is carried out at 1,000 to 3,000 rpm for 5 to 60 min; and performing anaerobic digestion on the treated material.

* * * * *